(12) United States Patent
Wang et al.

(10) Patent No.: US 11,394,330 B2
(45) Date of Patent: Jul. 19, 2022

(54) TORQUE AND CURRENT CONTROL METHODS FOR SWITCHING VARIABLE ELECTRIC DRIVE VEHICLES

(71) Applicant: GM GLOBAL TECHNOLOGY OPERATIONS LLC, Detroit, MI (US)

(72) Inventors: Yue-Yun Wang, Troy, MI (US); Lei Hao, Troy, MI (US); Alireza Fatemi, Canton, MI (US); Thomas W. Nehl, Shelby Township, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 16/527,846

(22) Filed: Jul. 31, 2019

(65) Prior Publication Data
US 2021/0036643 A1    Feb. 4, 2021

(51) Int. Cl.
| | |
|---|---|
| *H02P 6/16* | (2016.01) |
| *H02P 6/04* | (2016.01) |
| *H02P 23/28* | (2016.01) |
| *H02J 7/18* | (2006.01) |
| *B60L 15/22* | (2006.01) |
| *B60W 20/13* | (2016.01) |

(52) U.S. Cl.
CPC ............... *H02P 23/28* (2016.02); *H02J 7/18* (2013.01); *B60L 15/22* (2013.01); *B60W 20/13* (2016.01)

(58) Field of Classification Search
CPC .. B60L 50/30; B60L 53/60; H02P 6/17; H02P 29/20
See application file for complete search history.

(56) References Cited

U.S. PATENT DOCUMENTS

| | | | |
|---|---|---|---|
| 2016/0001674 A1* | 1/2016 | Mikulec | B60L 58/19 318/139 |
| 2019/0084438 A1* | 3/2019 | Takamatsu | H02J 7/0024 |
| 2019/0158004 A1* | 5/2019 | Pramod | H02P 6/10 |
| 2019/0199260 A1* | 6/2019 | Taniguchi | H02P 21/22 |
| 2019/0238063 A1* | 8/2019 | Irie | H02M 7/53871 |

\* cited by examiner

*Primary Examiner* — Muhammad S Islam
*Assistant Examiner* — Charles S Laughlin

(57) ABSTRACT

A current command module is configured to, based on a direct current (DC) bus voltage for an electric motor of the vehicle, generate a d-axis current command for the electric motor and a q-axis current command for the electric motor. A voltage command module configured to generate voltage commands based on the d-axis current command and the q-axis current command. A battery switching control module is configured to: determine a voltage operating state of a battery based on the voltage commands; compare a battery parameter to at least one of a predetermined voltage parameter and a predetermined current parameter during a dwell time when a plurality of switches of the battery are open; and generate a switch control signal to transition at least one switch of the plurality of switches to cause the battery to operate in the voltage operating state based on the comparison.

21 Claims, 8 Drawing Sheets

TORQUE AND CURRENT CONTROL METHODS FOR SWITCHING VARIABLE ELECTRIC DRIVE VEHICLES

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle propulsion systems and more particularly to systems and methods for controlling an electric motor of a vehicle.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. In pure electric vehicles, without an internal combustion engine, batteries serve as the only energy source and only electric motors are used for vehicle propulsion.

SUMMARY

In a feature, an electric motor control system includes: a current command module configured to, based on a motor torque request, a motor speed, a direct current (DC) bus voltage for an electric motor of the vehicle, generate a d-axis current command for the electric motor and a q-axis current command for the electric motor; a voltage command module configured to generate voltage commands based on the d-axis current command and the q-axis current command; and a battery switching control module configured to: determine a voltage operating state of a battery based on the voltage commands; compare a battery parameter to at least one of a predetermined voltage parameter and a predetermined current parameter during a dwell time when a plurality of switches of the battery are open; and generate a switch control signal to transition at least one switch of the plurality of switches to cause the battery to operate in the voltage operating state based on the comparison.

In further features, wherein the dwell time corresponds to a time period between a first voltage operating state and a second voltage operating state.

In further features, wherein the battery parameter comprises at least one of a measured voltage and a measured current.

In further features, an inverter module is connected between the battery and the electric motor.

In further features, the inverter module is configured to convert voltage provided by the battery and provide the converted voltage to the motor.

In further features, a capacitor is disposed between the battery and the inverter module, wherein the capacitor stores energy provided by the battery.

In further features, a capacitance value of the capacitor is selected according to $$C=2*(Tdw-\Delta(t))*(rpm*Nm*2pi/60)/([Vst2]^2-[Vst1]^2),$$

where Tdw corresponds to the dwell time, Vst2 is a voltage corresponding to a second voltage operating state, Vst1 is a voltage corresponding to a first voltage operating state, rpm corresponds to revolutions per minute of the motor, Nm corresponds to a torque of the motor, and $\Delta(t)$ is a predetermined slack time parameter.

In further features, the battery comprises at least a first battery and a second battery.

In further features, the first battery includes a rating of greater than 60 volts direct current (DC), and the second battery includes a rating of greater than 60 volts DC.

In further features, the plurality of switches are arranged so that the first battery and the second battery operate in parallel in a first voltage operating state and operate in series in a second voltage operating state.

In a feature, an electric motor control method includes: based on a motor torque request, a motor speed, a direct current (DC) bus voltage for an electric motor of the vehicle, generating a d-axis current command for the electric motor and a q-axis current command for the electric motor; generating voltage commands based on the d-axis current command and the q-axis current command; determining a voltage operating state of a battery based on the voltage commands; comparing a battery parameter to at least one of a predetermined voltage parameter and a predetermined current parameter during a dwell time when a plurality of switches of the battery are open; and generating a switch control signal to transition at least one switch of the plurality of switches to cause the battery to operate in the voltage operating state based on the comparison.

In further features, the dwell time corresponds to a time period between a first voltage operating state and a second voltage operating state.

In further features, the battery parameter comprises at least one of a measured voltage and a measured current.

In further features, the method further includes selectively switching an inverter module connected between the battery and the electric motor.

In further features, the method further includes by the inverter module, converting voltage provided by the battery and providing the converted voltage to the motor.

In further features, the method further includes, by a capacitor connected between the battery and the inverter module, storing energy provided by the battery.

In further features, the method further includes selecting a capacitance of the capacitor according to $$C=2*(Tdw-\Delta(t))*(rpm*Nm*2pi/60)/([Vst2]^2-[Vst1]^2),$$

where Tdw corresponds to the dwell time, Vst2 is a voltage corresponding to a second voltage operating state, Vst1 is a voltage corresponding to a first voltage operating state, rpm corresponds to revolutions per minute of the motor, Nm corresponds to a torque of the motor, and $\Delta(t)$ is a predetermined slack time parameter.

In further features, the battery comprises at least a first battery and a second battery.

In further features, the first battery includes a rating of greater than 60 volts direct current (DC), and the second battery includes a rating of greater than 60 volts DC.

In further features, the method further includes: switching the plurality of switches such that the first battery and the second battery are connected in parallel in a first voltage operating state; and switching the plurality of switches such that the first battery and the second battery are connected in series in a second voltage operating state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders to generate propulsion torque. The engine outputs torque to wheels of the vehicle via a transmission. Some types of vehicles may not include an internal combustion engine, such as a pure electric vehicle, or the internal combustion engine may not be mechanically coupled to a driveline of the vehicle.

An electric motor may be mechanically coupled to a shaft of the transmission. Under some circumstances, a control module of the vehicle may apply power to the electric motor from a battery to cause the electric motor to output torque for vehicle propulsion. Under other circumstances, the control module may disable power flow to the electric motor and allow the transmission to drive rotation of the electric motor. The electric motor generates power when driven by the transmission. Power generated by the electric motor can be used to recharge the battery when a voltage generated via the electric motor is greater than a voltage of the battery. An inverter can be used to boost the motor voltage above the battery voltage when the motor voltage is less than the battery voltage.

The control module determines a d-axis (direct-axis) current command and a q-axis (quadrature-axis) current command for the electric motor based on a requested torque and speed output of the electric motor. A voltage command module generates voltage commands for the electric motor based on the d-axis current command and the q-axis current command. According to the present disclosure, a battery switching control module can determine a voltage operating state of a battery based on the voltage commands and compare a battery system parameter to a predetermined voltage parameter or a predetermined current parameter during a dwell time when a plurality of switches of the battery are open. Based on the comparison, the battery switching control module generates a switch control signal to transition at least one switch to cause the battery to operate in the voltage operating state.

Figure 1:
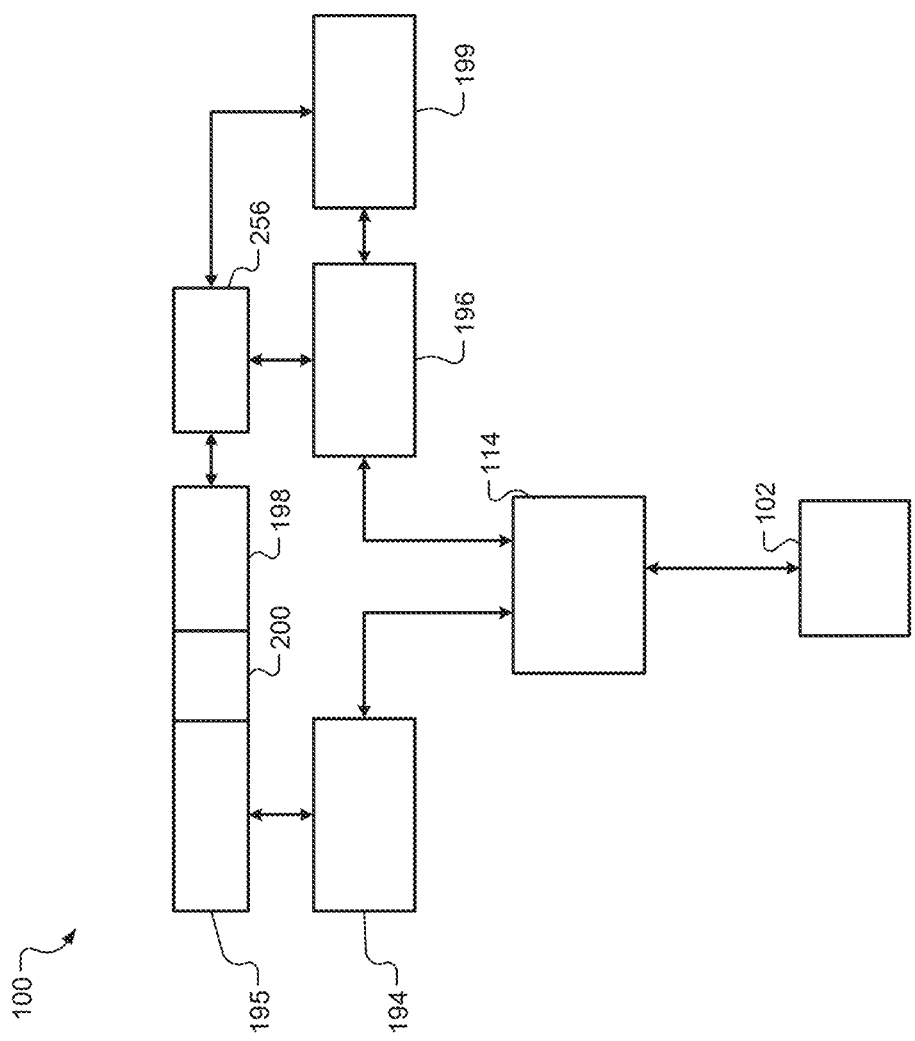
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine, fuel cell vehicles, autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198. This may be referred to as regeneration.

Figure 2:
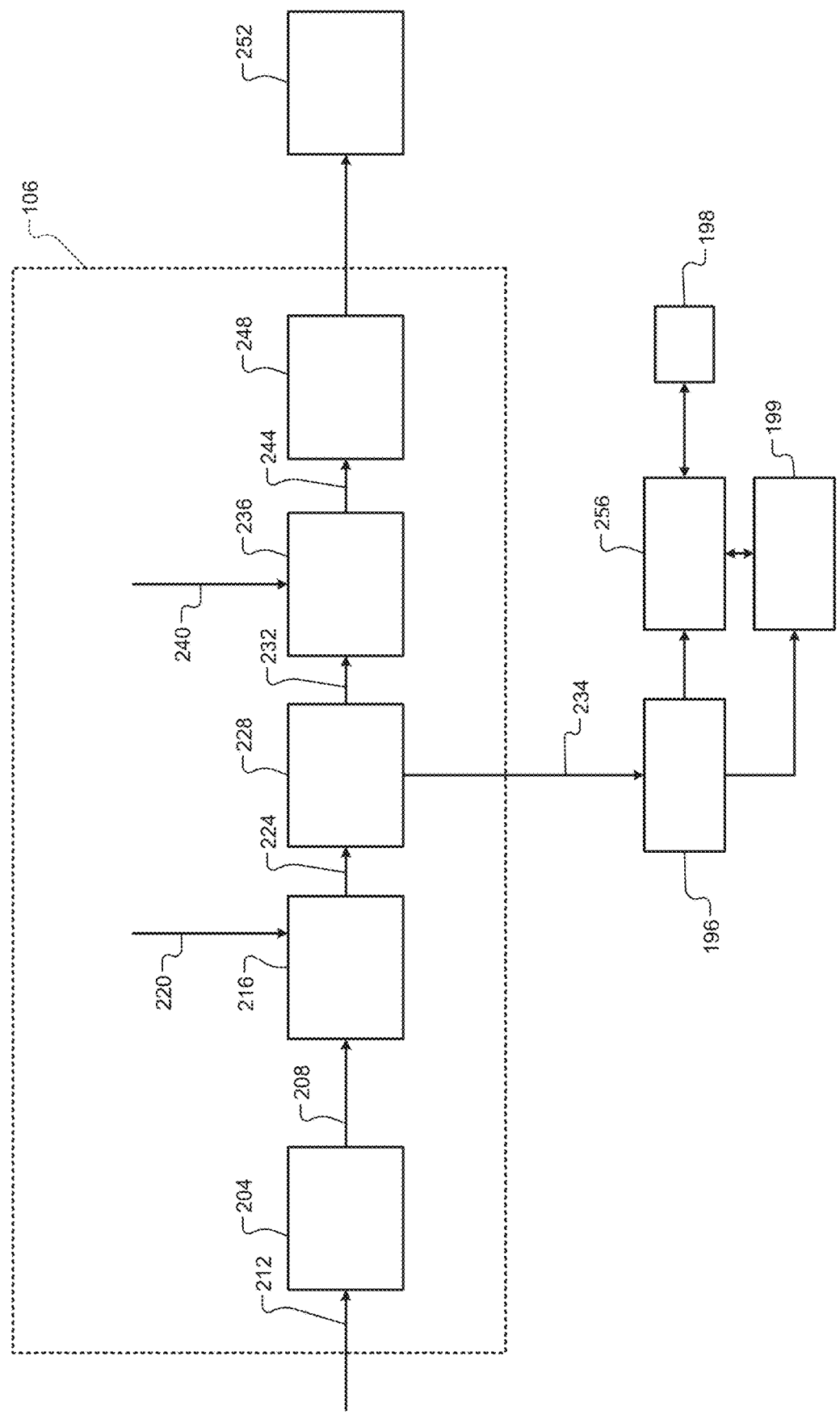
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), and/or cruise control input. In various implementations, the cruise control input may be provided by an adaptive cruise control system that attempts to maintain at least a predetermined distance between the vehicle and objects in a path of the vehicle. The driver torque module 204 determines the driver torque request 208 based on one or more lookup tables that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 114 may be omitted, and the driver torque module 204 and the axle torque arbitration module 216 may be implemented within the motor control module 196.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of an inverter module 256 based on the motor torque request 234. Switching of the inverter module 256 controls power flow from the battery 199 to the electric motor 198. As such, switching of the inverter module 256 controls torque of the electric motor 198. The inverter module 256 also converts power generated by the electric motor 198 and outputs power to the battery 199, for example, to charge the battery 199.

The inverter module 256 includes a plurality of switches. The switches are switched to convert DC power from the battery 199 into alternating current (AC) power and apply the AC power to the electric motor 198 to drive the electric motor 198. For example, the inverter module 256 may convert the DC power from the battery 199 into n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the battery 199. The one or more filters may be implemented, for example, to filter power flow to and from the battery 199. As an example, a filter including one or more capacitors and resistors may be electrically connected in parallel with the inverter module 256 and the battery 199.

Figure 3:
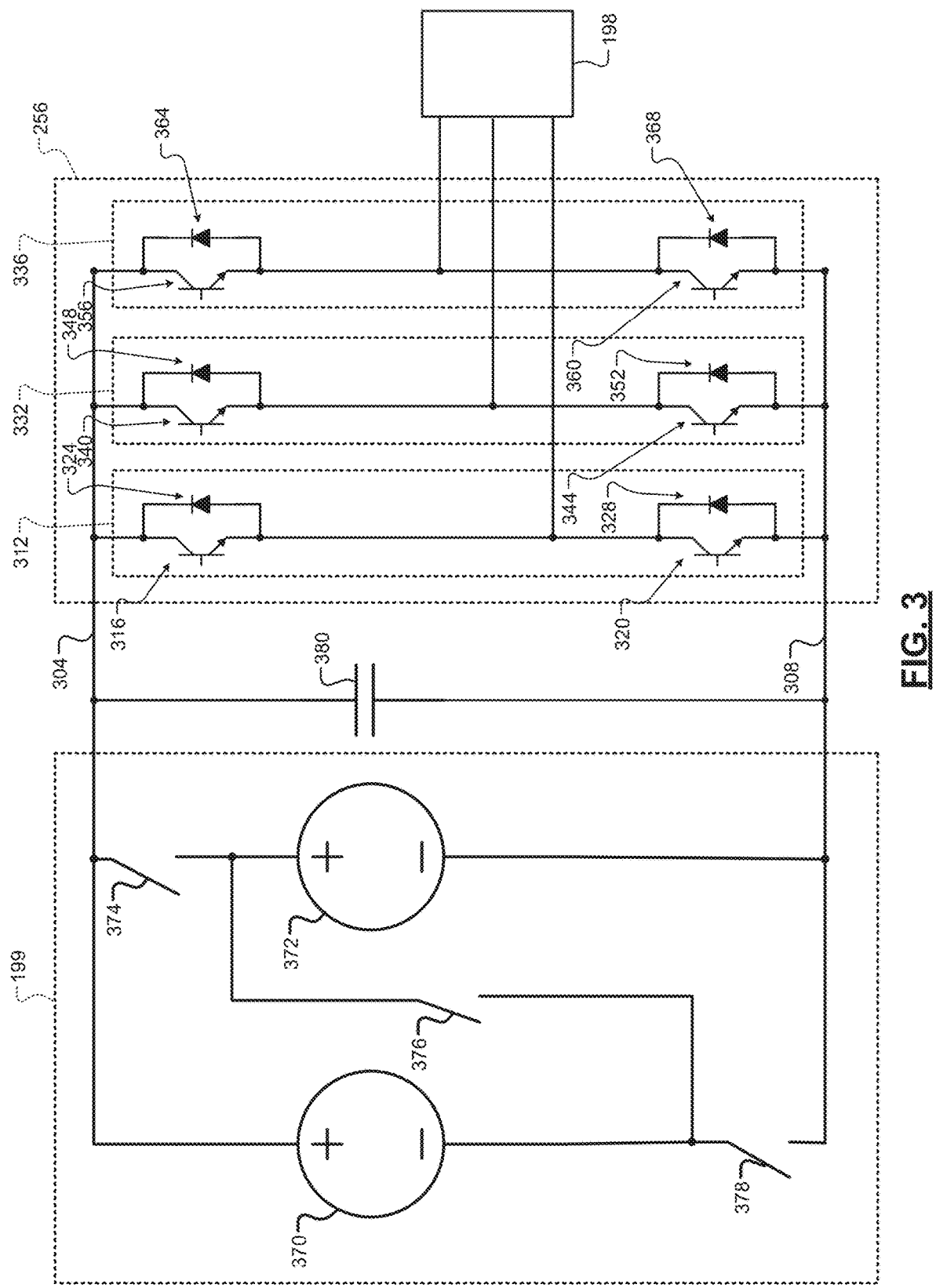
FIG. 3 is a schematic including an example implementation of an inverter module and a battery.

FIG. 3 includes a schematic including an example implementation of the inverter module 256 and the battery 199. High (positive) and low (negative) sides 304 and 308 are connected to positive and negative terminals, respectively, of the battery 199. The inverter module 256 is also connected between the high and low sides 304 and 308.

The inverter module 256 includes three legs, one leg connected to each phase of the electric motor 198. A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 is connected to a first phase (e.g., a) of the electric motor 198.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the battery 199. This charges the battery 199. The diodes 324 and 328 form one phase of a three-phase rectifier.

The inverter module 256 also includes second and third legs 332 and 336. The second and third legs 332 and 336 may be (circuitry wise) similar or identical to the first leg 312. In other words, the second and third legs 332 and 336 may each include respective switches and diodes like the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 is connected to a second stator winding (e.g., b) of the electric motor 198. The third leg 336 includes switches 356 and 360 and anti-parallel diodes 364 and 368. A node connected to the second terminal of the switch 356 and the first terminal of the switch 360 is connected to a third stator winding (e.g., c) of the electric motor 198.

As shown in FIG. 3, the battery 199 includes a first battery 370 and a second battery 372. In an example implementation, the batteries 370, 372 are direct current (DC) batteries. The battery 199 also includes a first switch 374, a second switch 376, and a third switch 378. The switches 374, 376, and 378 each include a first terminal, a second terminal, and a control terminal. Each of the switches 374, 376, and 378 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

As described herein, the motor control module 196 can also control the switches 374, 376, and 378 allowing the motor 198 to operate at variable voltages. For example, the batteries 370 and 372 may be four hundred volt (400 V) DC batteries or other suitable high voltage (e.g., greater than 60 V) batteries. Thus, based on the configuration of the switches 374, 376, and 378, the voltage provided to the motor may range between about three hundred and fifty volts (350 V) and about seven hundred volts (700 V). For example, when switches 374 and 378 are closed and switch 376 is open, the battery 199 is operating in a first voltage operating state and may provide about three hundred and fifty volts to the inverter 256.

When switch 376 is closed and switches 374 and 378 are open, the battery 199 is operating in a second voltage operating state and may provide about seven hundred volts to the inverter 256. A capacitor 380 is connected between terminals 304 and 308 to store charge. As shown in FIG. 3, the switches 374, 376, 378 are arranged so that the batteries 370 and 372 operate in parallel in the first voltage operating state and operate in series in a second voltage operating state.

Figure 4:
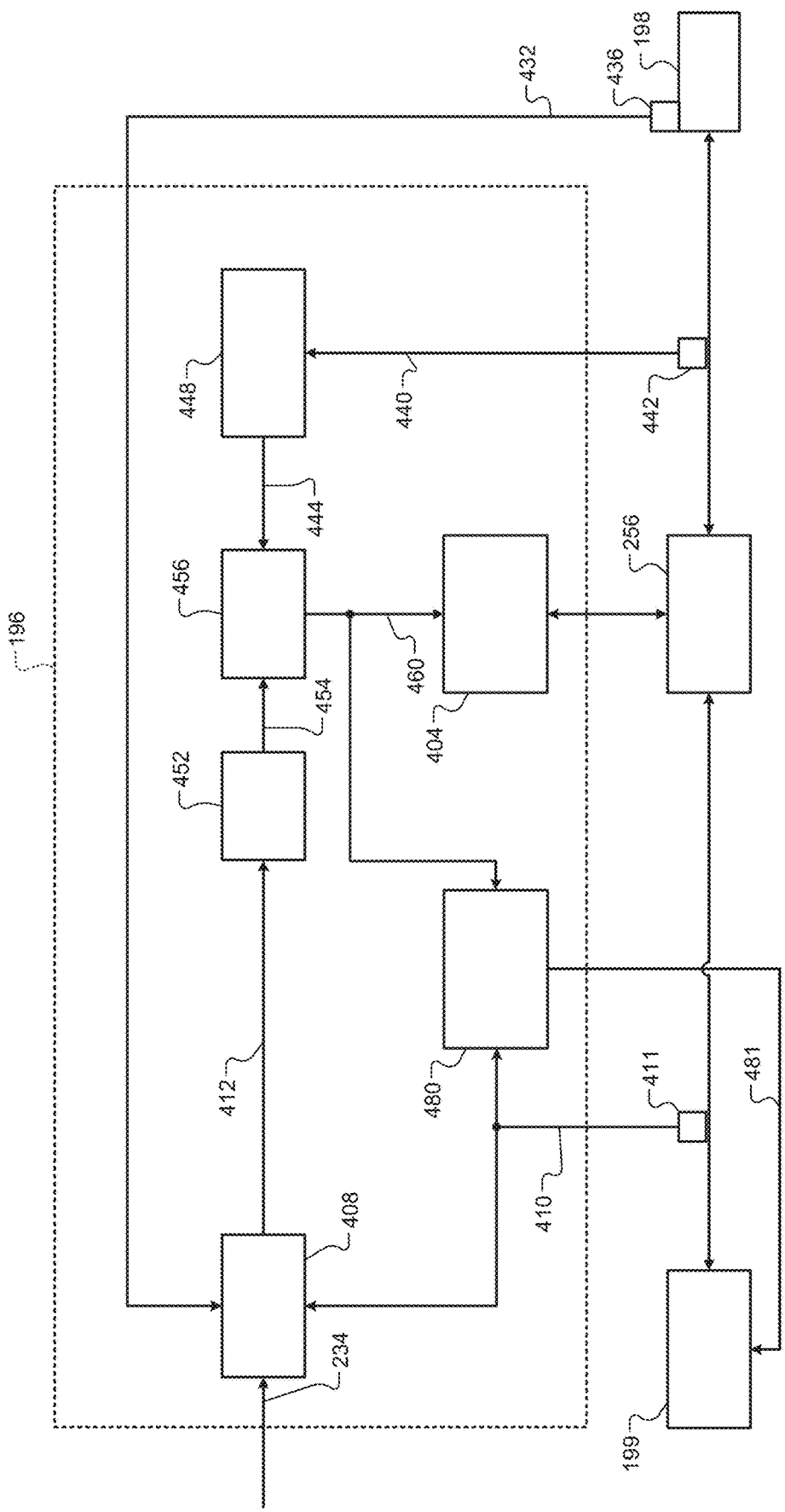
FIG. 4 is a functional block diagram including an example implementation of a motor control module.

FIG. 4 is a functional block diagram including an example implementation of the motor control module 196. An inverter switching control module 404 controls switching of the switches 316 and 320 using pulse width modulation (PWM) signals. For example, the inverter switching control module 404 may apply PWM signals to the control terminals of the switches 316, 320, 340, 344, 356, and 360. When on, power flows from the battery 199 to the electric motor 198 to drive the electric motor 198.

For example, the inverter switching control module 404 may apply generally complementary PWM signals to the control terminals of the switches 316 and 320 when applying power from the battery 199 to the electric motor 198. In other words, the PWM signal applied to the control terminal of the first switch 316 is opposite in polarity to the PWM signal applied to the control terminal of the second switch 320. Short circuit current may flow, however, when the turning on of one of the switches 316 and 320 overlaps with the turning off of the other of the switches 316 and 320. As such, the inverter switching control module 404 may generate the PWM signals to turn both of the switches 316 and 320 off during a deadtime period (T dead) before turning either one of the switches 316 and 320 on. With this in mind, generally complementary may mean that two signals have opposite polarities for a majority of their periods when power is being output to the electric motor 198. Around transitions, however, both PWM signals may have the same polarity (off) for some overlap deadtime period.

The PWM signals provided to the switches of the second and third legs 332 and 336 may also be generally complementary per leg. The PWM signals provided to the second and third legs 332 and 336 may be phase shifted from each other and from the PWM signals provided to the switches 316 and 320 of the first leg 312. For example, the PWM signals for each leg may be phase shifted from each other leg by 120° (360°/3 legs=120° shift per leg). In this way, the currents through the stator windings (phases) of the electric motor 198 are phase shifted by 120° from each other.

A current command module 408 determines a d-axis current command (Id Command) and a q-axis current command (Iq Command) for the electric motor 198 based on the motor torque request 234, a (mechanical) rotor speed 432 of the electric motor 198, and a DC bus voltage 410. The current command module 408 may determine the d and q-axis current commands, for example, using one or more equations and/or lookup tables that relate DC bus voltages, speeds, and motor torque requests to d and q-axis current commands. As discussed above, the DC bus voltage can vary based on the voltage operating state (e.g., about three hundred and fifty volts in the first voltage operating state and about 700 volts in the second voltage operating state). When all of the battery switches are open, the DC bus voltage may drop to or below a minimum DC bus voltage, such as approximately 100 volts.

A voltage sensor 411 measures the DC bus voltage 410 between the battery 199 and the inverter module 256 (e.g., between the high and low sides 304 and 308) and the voltage at the capacitor 380. The d-axis current command and the q-axis current command are collectively illustrated by 412. The axis of the field winding in the direction of the DC field is called the rotor direct axis or the d-axis. The axis that is 90 degrees after the d-axis is called the quadrature axis or q-axis.

The rotor speed 432 is a (mechanical) rotational speed of the rotor of the electric motor 198. The rotor speed 432 may be measured, for example, using a rotor speed sensor 436. In various implementations, the rotor speed 432 may be determined by a rotor speed module based on one or more other parameters, such change in position of the rotor over time where position is determined based on phase currents 440 (e.g., Ia, Ib, Ic) of the electric motor 198. Current sensors 442 may measure the phase currents 440, such as in the respective legs of the inverter module 256. In various implementations, one or more of the phase currents 440 may be estimated.

A rate limiting module 452 rate limits changes in the d-axis current command and the q-axis current command. In other words, the rate limiting module 452 may adjust the d-axis current command toward a present value of the d-axis current command by up to a predetermined amount during each control loop. The rate limiting module 452 may adjust the q-axis current command toward a present value of the q-axis current command by up to a predetermined amount during each control loop. The rate limiting module 452 outputs rate limited d-axis and q-axis current commands that result from the rate limiting. The rate limited d-axis and q-axis current commands are collectively illustrated by 454.

A voltage command module 456 determines voltage commands for voltages to apply to the respective phases of the electric motor 198 based on the rate limited d-axis current command and the rate limited q-axis current command, a d-axis current of the electric motor 198, and a q-axis current of the electric motor 198. The d-axis current and the q-axis current are collectively illustrated by 460. The voltage command module 456 may determine the voltage commands 460 using one or more equations and/or lookup tables that relate d and q axis current commands and d and q-axis currents to voltage commands. In various implementations, the voltage command module 456 may generate the voltage commands 460 using closed-loop control to adjust the d and q-axis currents 444 toward or to the rate limited d and q-axis current commands 454, respectively. A frame of reference (FOR) module 448 may transform the phase currents 440 into the d and q-axis currents 444 by applying a Clarke transform and a Park transform.

The inverter switching control module 404 determines final duty cycles of the PWM signals to apply to the phases of the electric motor 198 based on the respective voltage commands of the phases. For example, the inverter switching control module 404 may determine initial duty cycle commands using one or more equations or lookup tables that relate voltage commands to PWM duty cycles. The inverter switching control module 404 determines the final duty cycle commands of the PWM signals to apply to the phases based on the initial duty cycle commands of the phases, respectively, and the respective phase currents.

A battery switching control module 480 determines the switch control signals 481 to apply to the switches 374, 376, and 378 of the battery 199 based on the voltage and/or current commands. For example, the battery switching control module 480 may determine the switch control using one or more equations and/or lookup tables that relate the voltage and/or current commands to battery voltage levels (e.g., three hundred and fifty volts, seven hundred volts).

Figure 5:
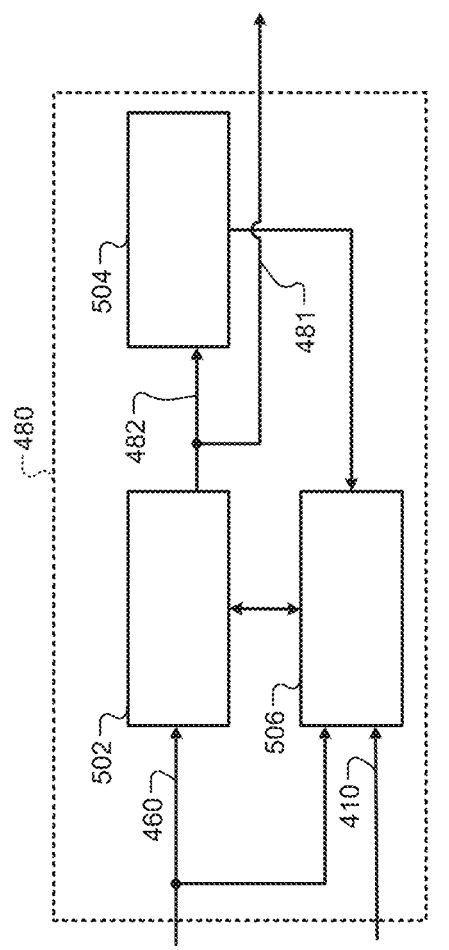
FIG. 5 is a functional block diagram of an example implementation of a battery switching control module.

FIG. 5 is a functional block diagram including an example implementation of the battery switching control module 480. As shown, the battery switching control module 480 includes a switch selection module 502, a counter 504, and a monitoring module 506.

The switch selection module 502 determines the switch control signals to apply to the switches 374, 376, and 378 based on the voltage and/or current commands. For instance, the switch selection module 502 can determine the switch control using one or more equations and/or lookup tables that relate the voltage and/or current commands to battery voltage levels and output the switch control signals 481 to the battery 199.

As described in greater detail below, the counter 504 can increment a time counter based on the switch configuration indicated by the switch control signals 481 and provide a counter signal 482 to the monitoring module 506 indicative of the time counter. The counter 504 can also compare the time counter with a dwell time in which each of the switches 374, 376, and 378 are open. In an implementation, the dwell time corresponds to the time when the battery 199 transitions from the first voltage operating state to the second voltage operating state, or vice versa, and the switches 374, 376, and 378 are open to mitigate damage and/or drive torque disturbance.

Figure 6:
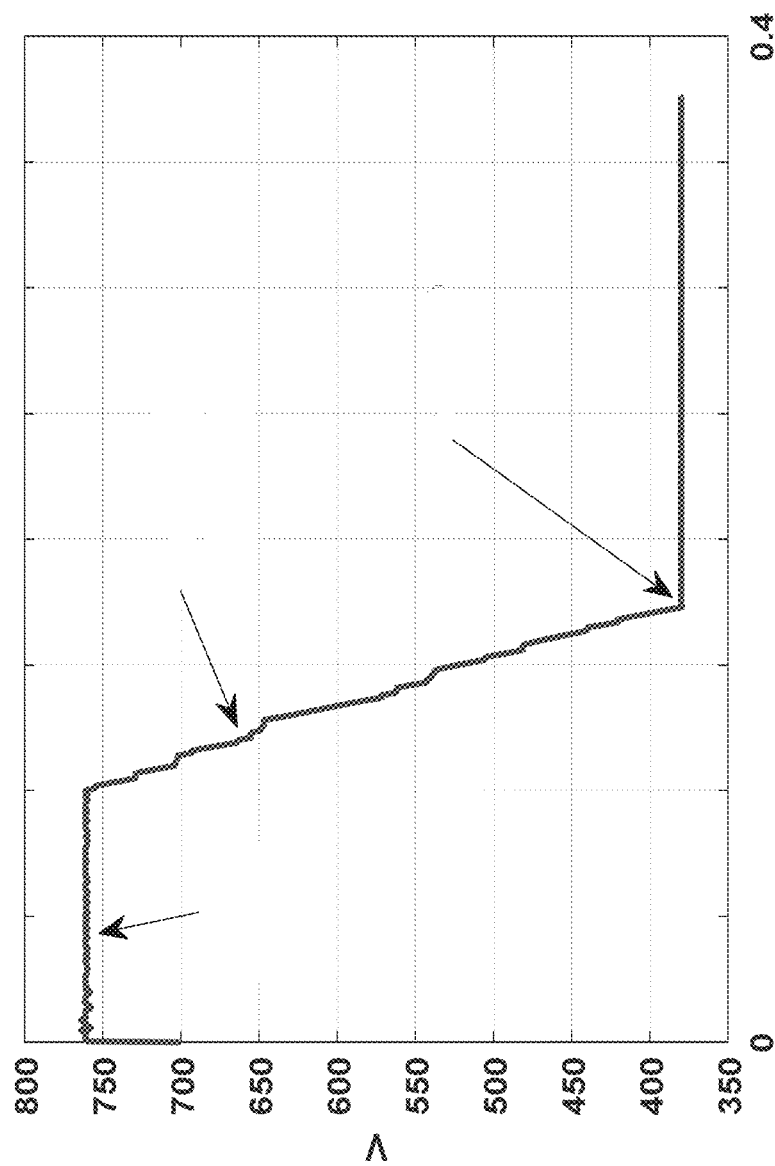
FIG. 6 is a graph illustrating capacitor voltage as a function of time based on an voltage operating state of the battery.

The monitoring module 506 monitors the voltage and/or current commands 460 and the DC bus voltage and/or capacitor voltage 410 as measured by the voltage sensor 411. The monitoring module 506 provides signals indicative of the voltage, the current commands, the DC bus voltage, and/or capacitor voltage to the switch selection module 502. FIG. 6 is a graph 600 illustrating the approximate capacitor voltages at the capacitor 380.

The value of the capacitor 380 can be selected such that the stored charge is used by the motor 198 when the battery transitions from the second voltage operating state to the first voltage operating state. The value of the capacitor 380 can be derived using the following equation:

$$Tdw = \frac{1}{2}C([Vst2]^2 - [Vst1]^2)/(rpm*Nm*2pi/60) + \Delta(t) \qquad \text{Eq. 1,}$$

which can be rewritten as:

$$C = 2*(Tdw - \Delta(t))*(rpm*Nm*2pi/60)/([Vst2]^2 - [Vst1]^2)$$

where Tdw is the dwell time, C is the capacitance value of capacitor 380, Vst2 is the voltage corresponding to the second voltage operating state, Vst1 is the voltage corresponding to the first voltage operating state, rpm represents the revolutions per minute of the motor 198, Nm represents the torque of the motor 198, and $\Delta(t)$ is a predetermined slack time parameter.

Figure 7:
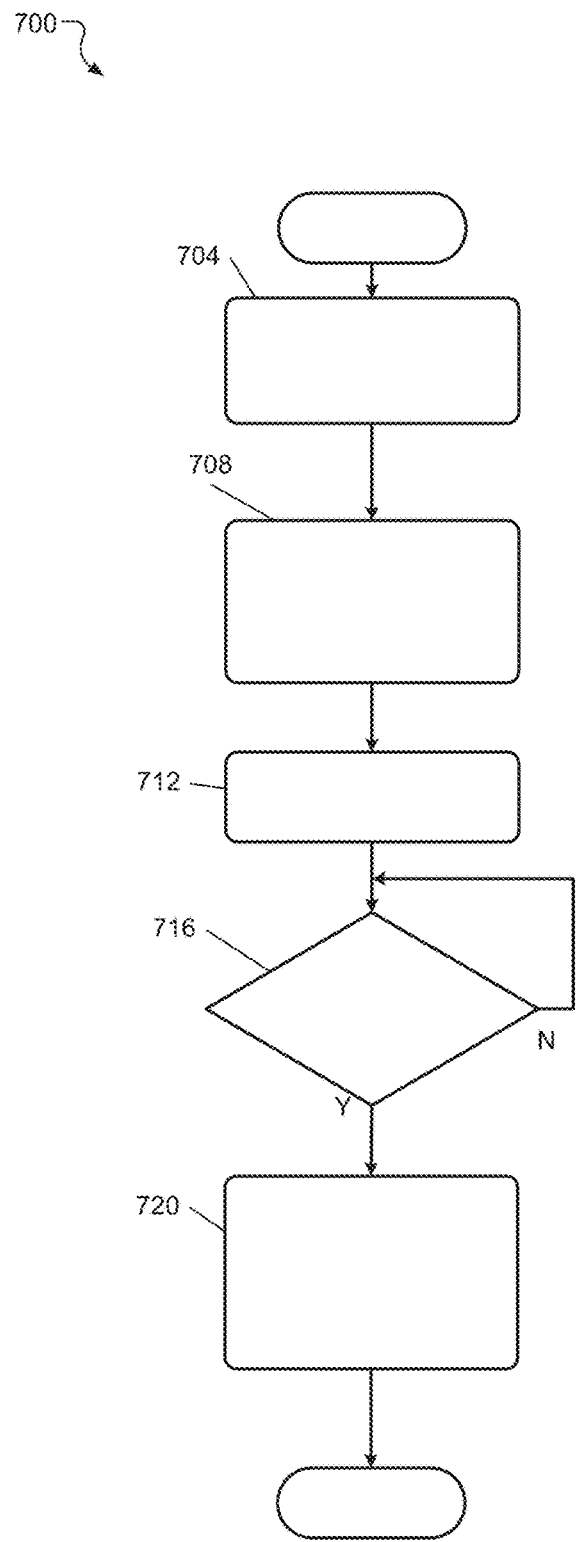
FIGS. 7 and 8 are flowcharts depicting example methods of controlling the battery.

FIG. 7 is a flowchart depicting an example method 700 for switching the battery 199 from the second voltage operating state to the first voltage operating state in which switch 376 is initially closed and switches 374 and 378 are initially open. The method 700 begins with 704 where the switch selection module 502 receives one or more voltage and/or current commands to transition the battery 199 from the second voltage operating state to the first voltage operating state. Based on the voltage and/or current commands, the switch selection module 502 opens the switch 376 at 708. At 712, the monitoring module 506 monitors the voltage of the capacitor 380.

At 716, the monitoring module 506 determines whether the absolute value of the difference between the capacitor voltage and a predetermined voltage value corresponding to the first voltage operating state (Vst1) is less than a predetermined voltage parameter. If the absolute value of the difference is not less than the predetermined voltage parameter, the method 700 returns to 716. If the absolute value of the difference is less than or equal to the predetermined voltage parameter, the monitoring module 506 provides a signal to the switch selection module 502 to close switches 374 and 378 at 720.

Figure 8:
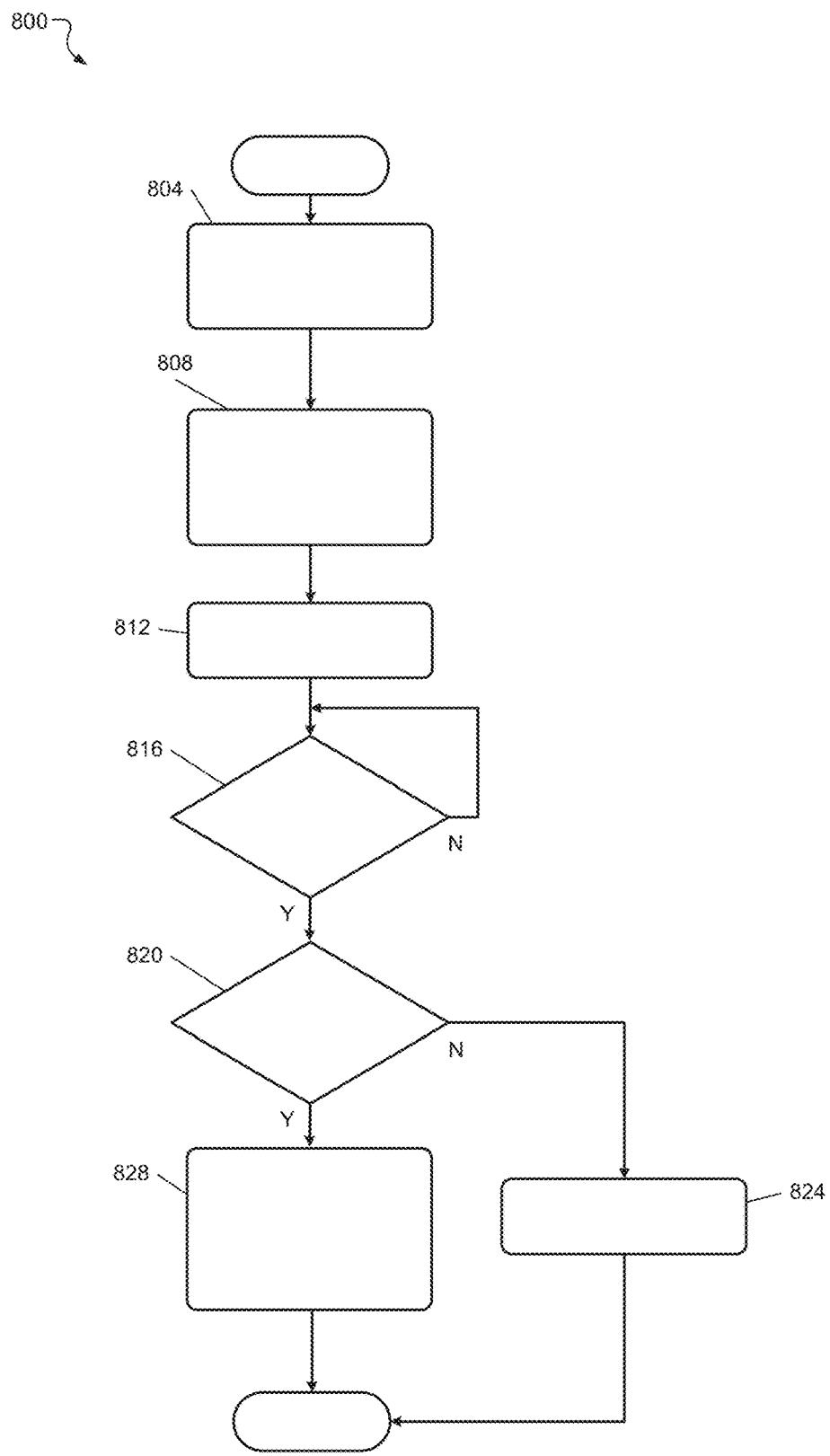

FIG. 8 is a flowchart depicting an example method 800 for switching the battery 199 from the first voltage operating state to the second voltage operating state in which switch 376 is initially open and switches 374 and 378 are initially closed. The method 800 begins with 804 where the switch selection module 502 receives one or more voltage and/or current commands to transition the battery 199 from the first voltage operating state to the second voltage operating state. Based on the voltage and/or current commands, the switch selection module 502 opens the switch 374 and 376 at 808. At 812, the monitoring module 506 monitors the battery current and the counter module 504 increments the time counter. The motor operates as a generator that charges the capacitor to a higher voltage level.

At 816, the monitoring module 506 determines whether the time counter is greater than the dwell time. If the time counter is not greater than the dwell time, the method 800 returns to 816. At 820, the monitoring module 506 determines whether the battery current equals zero. If the battery current does not equal zero, the method 800 terminates operation at 824. If the battery current equals zero, the monitoring module 506 provides a signal to the switch selection module 502 so that the switch selection module 502 can generate switch control signals to close switch 376 at 828.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electric motor control system, comprising:
    a current command module configured to, based on a motor torque request, a motor speed, a direct current (DC) bus voltage for an electric motor of a vehicle, generate a d-axis current command for the electric motor and a q-axis current command for the electric motor;
    a voltage command module configured to generate voltage commands based on the d-axis current command and the q-axis current command; and
    a battery switching control module configured to:
        based on the voltage commands, selectively determine to transition a voltage operating state of a battery from a first voltage operating state to a second voltage operating state;
        in response to the determination to transition the voltage operating state of the battery to the second voltage operating state, open a plurality of switches of the battery for a dwell time;
        compare (a) a battery parameter during the dwell time when the plurality of switches of the battery are open to (b) at least one of a predetermined voltage parameter and a predetermined current parameter; and
        based on the comparison, generate a switch control signal to transition at least one switch of the plurality of switches to cause the battery to transition to the second voltage operating state.

2. The electric motor control system as recited in claim 1, wherein the dwell time corresponds to a time period between the first voltage operating state and the second voltage operating state.

3. The electric motor control system as recited in claim 1, wherein the battery parameter comprises at least one of a measured voltage and a measured current.

4. The electric motor control system as recited in claim 1, further comprising an inverter module connected between the battery and the electric motor.

5. The electric motor control system as recited in claim 4, wherein the inverter module is configured to convert voltage provided by the battery and provide the converted voltage to the electric motor.

6. The electric motor control system as recited in claim 4, further comprising a capacitor disposed between the battery and the inverter module, wherein the capacitor stores energy provided by the battery.

7. The electric motor control system as recited in claim 6, wherein a capacitance value of the capacitor is selected according to $$C=2*(Tdw-\Delta(t))*(rpm*Nm*2pi/60)/([Vst2]^2-[Vst1]^2),$$

where Tdw corresponds to the dwell time, Vst2 is a voltage corresponding to the second voltage operating state, Vst1 is a voltage corresponding to the first voltage operating state, rpm corresponds to revolutions per minute of the electric motor, Nm corresponds to a torque of the electric motor, and $\Delta(t)$ is a predetermined slack time parameter.

8. The electric motor control system as recited in claim 1, wherein the battery comprises at least a first battery and a second battery.

9. The electric motor control system of claim 8 wherein the first battery includes a rating of greater than 60 volts direct current (DC), and the second battery includes a rating of greater than 60 volts DC.

10. The electric motor control system as recited in claim 8, wherein the plurality of switches are arranged so that the first battery and the second battery operate in parallel in the first voltage operating state and operate in series in the second voltage operating state.

11. An electric motor control method, comprising:
    based on a motor torque request, a motor speed, a direct current (DC) bus voltage for an electric motor of a vehicle, generating a d-axis current command for the electric motor and a q-axis current command for the electric motor;
    generating voltage commands based on the d-axis current command and the q-axis current command;
    based on the voltage commands, selectively determining to transition a voltage operating state of a battery from a first voltage operating state to a second voltage operating state;
    in response to determining to transition the voltage operating state to the second voltage operating state, opening a plurality of switches of the battery for a dwell time;
    comparing (a) a battery parameter during the dwell time when the plurality of switches of the battery are open to (b) at least one of a predetermined voltage parameter and a predetermined current parameter; and
    based on the comparison, generating a switch control signal to transition at least one switch of the plurality of switches to cause the battery to transition to the second voltage operating state.

12. The electric motor control method as recited in claim 11, wherein the dwell time corresponds to a time period between the first voltage operating state and the second voltage operating state.

13. The electric motor control method as recited in claim 11, wherein the battery parameter comprises at least one of a measured voltage and a measured current.

14. The electric motor control method as recited in claim 11, further comprising selectively switching an inverter module connected between the battery and the electric motor.

15. The electric motor control method as recited in claim 14 further comprising, by the inverter module, converting voltage provided by the battery and providing the converted voltage to the electric motor.

16. The electric motor control method as recited in claim 14 further comprising, by a capacitor connected between the battery and the inverter module, storing energy provided by the battery.

17. The electric motor control method as recited in claim 16 further comprising selecting a capacitance of the capacitor according to $$C=2*(Tdw-\Delta(t))*(rpm*Nm*2pi/60)/([Vst2]^2-[Vst1]^2),$$

where Tdw corresponds to the dwell time, Vst2 is a voltage corresponding to the second voltage operating state, Vst1 is a voltage corresponding to the first voltage operating state, rpm corresponds to revolutions per minute of the electric motor, Nm corresponds to a torque of the electric motor, and $\Delta(t)$ is a predetermined slack time parameter.

18. The electric motor control method as recited in claim 11, wherein the battery comprises at least a first battery and a second battery.

19. The electric motor control method of claim 18 wherein the first battery includes a rating of greater than 60 volts direct current (DC), and the second battery includes a rating of greater than 60 volts DC.

20. The electric motor control method as recited in claim 18 further comprising:
switching the plurality of switches such that the first battery and the second battery are connected in parallel in the first voltage operating state; and
switching the plurality of switches such that the first battery and the second battery are connected in series in the second voltage operating state.

21. An electric motor control system, comprising:
a current command module configured to, based on a motor torque request, a motor speed, a direct current (DC) bus voltage for an electric motor of a vehicle, generate a d-axis current command for the electric motor and a q-axis current command for the electric motor;
a voltage command module configured to generate voltage commands based on the d-axis current command and the q-axis current command; and
a battery switching control module configured to:
determine a voltage operating state of a battery based on the voltage commands;
compare a battery parameter to at least one of a predetermined voltage parameter and a predetermined current parameter during a dwell time when a plurality of switches of the battery are open; and
generate a switch control signal to transition at least one switch of the plurality of switches to cause the battery to operate in the voltage operating state based on the comparison;
an inverter module connected between the battery and the electric motor; and
a capacitor disposed between the battery and the inverter module, wherein the capacitor stores energy provided by the battery,
wherein a capacitance value of the capacitor is selected according to $$C=2*(Tdw-\Delta(t))*(rpm*Nm*2pi/60)/([Vst2]^2-[Vst1]^2),$$

where Tdw corresponds to the dwell time, Vst2 is a voltage corresponding to a second voltage operating state, Vst1 is a voltage corresponding to a first voltage operating state, rpm corresponds to revolutions per minute of the electric motor, Nm corresponds to a torque of the electric motor, and $\Delta(t)$ is a predetermined slack time parameter.

* * * * *